March 29, 1960

G. S. KNAPP 2,930,095

DINNERWARE MAKING APPARATUS

Original Filed Dec. 12, 1955

INVENTOR.
GEORGE S. KNAPP
BY
Brown, Critchlow, Flick & Peckham
His ATTORNEYS

March 29, 1960  G. S. KNAPP  2,930,095
DINNERWARE MAKING APPARATUS
Original Filed Dec. 12, 1955  3 Sheets-Sheet 2
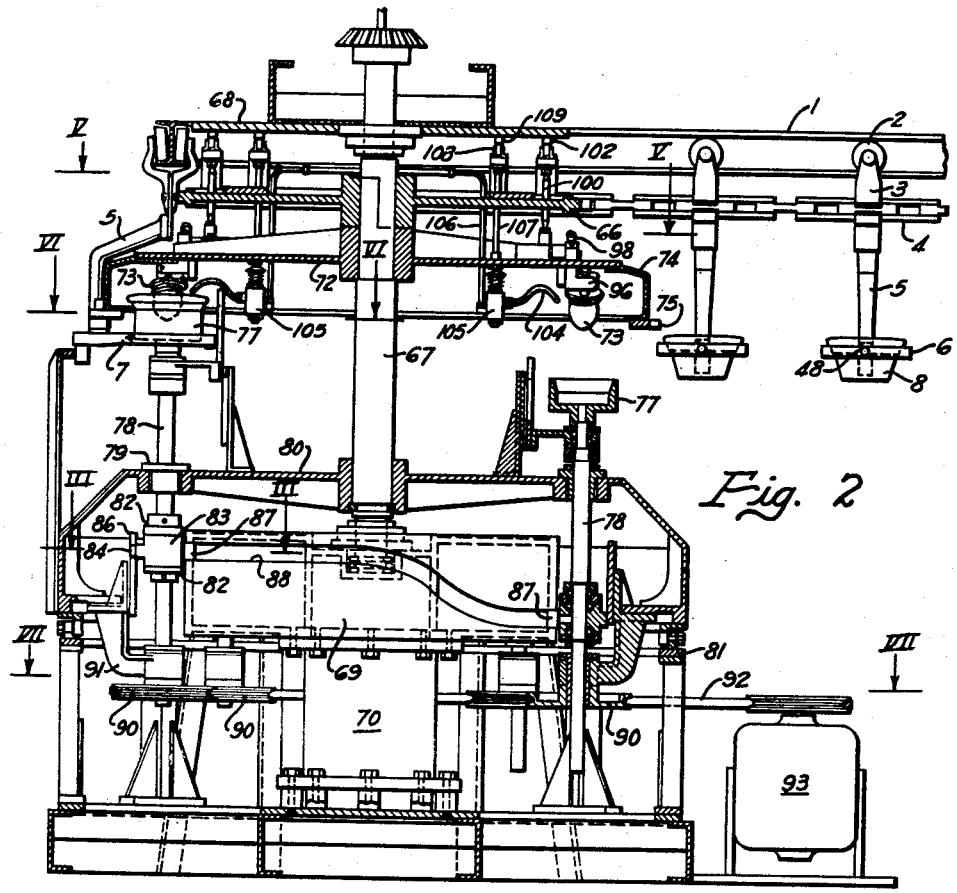
Fig. 2
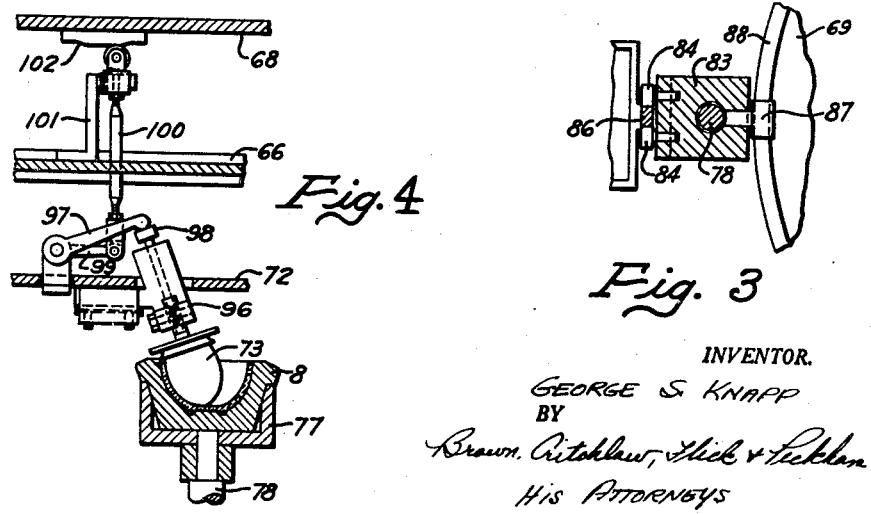
Fig. 4
Fig. 3
INVENTOR.
GEORGE S. KNAPP
BY
Brown, Critchlow, Flick & Peckham
His Attorneys March 29, 1960

G. S. KNAPP 2,930,095

DINNERWARE MAKING APPARATUS

Original Filed Dec. 12, 1955

INVENTOR.
GEORGE S. KNAPP
BY
HIS ATTORNEYS

United States Patent Office 2,930,095
Patented Mar. 29, 1960

2,930,095

DINNERWARE MAKING APPARATUS

George S. Knapp, Newell, W. Va.

Original application December 12, 1955, Serial No. 552,520. Divided and this application March 5, 1957, Serial No. 644,111

2 Claims. (Cl. 25—24)

This invention relates to apparatus for making ceramic dinnerware, and more particularly to a machine for jiggering ware on or in molds traveling past it on a conveyor. This application is a division of my copending patent application, Serial No. 552,520, filed December 12, 1955.

It is among the objects of this invention to provide a jigger machine which is entirely automatic, which can be operated at high speed, and through which molds move continuously without indexing.

The invention is illustrated in the accompanying drawings, in which

Fig. 2 is a central vertical section through the jigger machine;

Fig. 3 is an enlarged fragmentary horizontal section taken on the line III—III of Fig. 2;

Fig. 4 is an enlarged side view of a jigger tool during jiggering;

Fig. 8 is a view similar to Fig. 2 of a modification.

Figure 1:
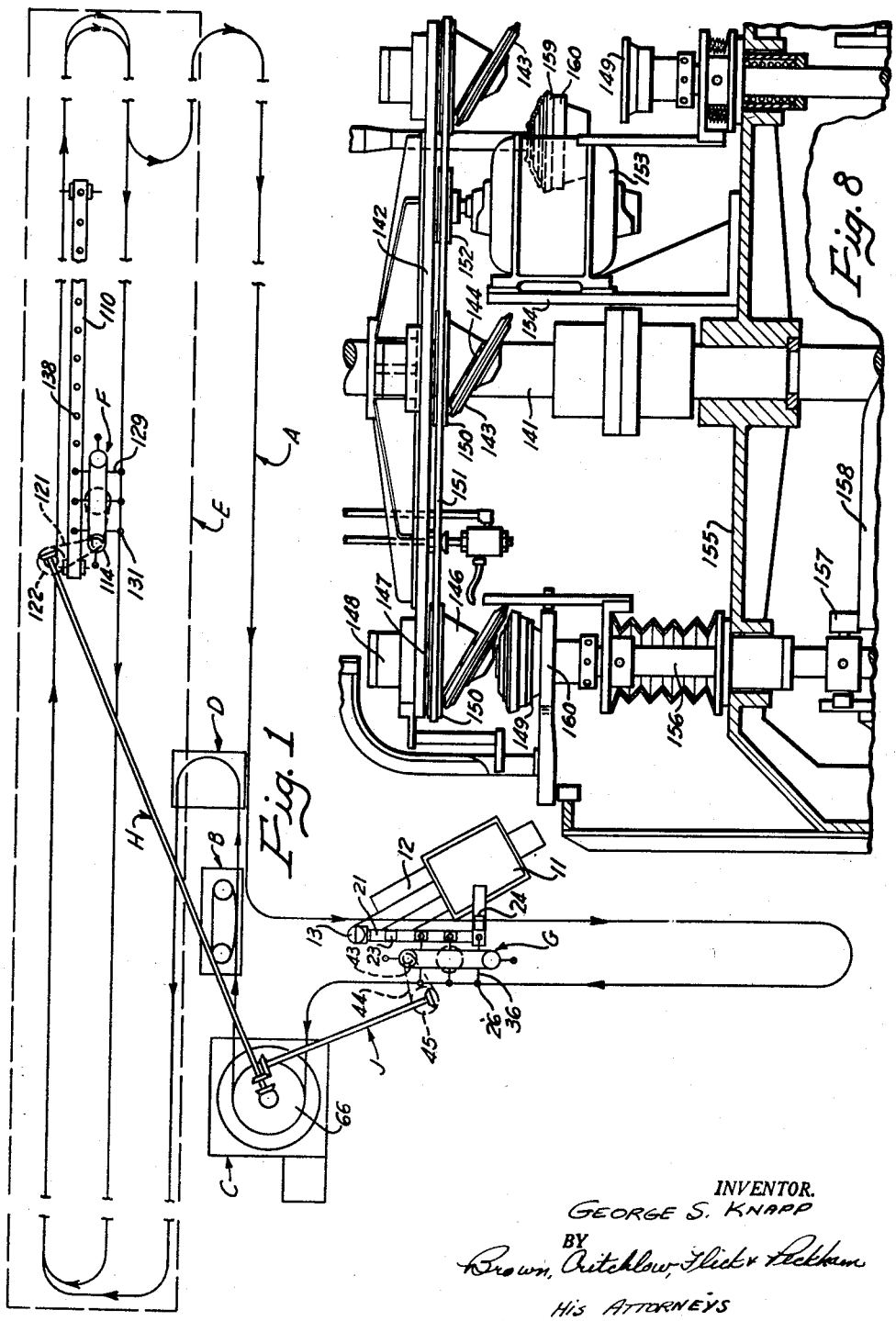
Fig. 1 is a schematic plan view of my apparatus.

Referring to Fig. 1 of the drawings, the course of travel of an endless overhead chain conveyor A for molds is indicated by the line with arrows. The chain is driven by a conveyor drive B which pulls it through the jigger C and other machines of the apparatus. As the conveyor chain leaves the drive, it loops through the chain take-up D and then travels up an incline to the top of the drying chamber E. The conveyor travels back and forth in this chamber at progressively lower levels and then down past the mold stripper F, where ware is removed from the molds. From there the conveyor loops around and finally returns to the mold charger G. It will be seen that the chain rotates the top of the jigger, which in turn can drive the mold stripper and charger through long shafts H and J, respectively.

The overhead conveyor A consists of three main parts, an endless track, trolleys running on the track, and an endless chain connected to the trolleys for moving them. As shown in Fig. 2, an I-beam 1 makes a good track and, due to the construction of this conveyor, the track can be curved both horizontally and vertically to suit local conditions and it also can be of any length desired. It is supported from above in any suitable manner. Each trolley has a pair of wheels 2 supported by the lower flanges of the track. The wheels are rotatably mounted in the upper ends of forked members 3, which hang down below the center of the track. Alternate links of the conveyor chain 4 are provided with vertical longitudinal slots, through some of which the trolley forks extend. The side faces of the forks are slotted to receive the links to support the chain. When the chain travels forward, it pulls all of the trolleys along the track with it. Rigidly connected to the lower end of each trolley is the upper end of an arm 5, which extends laterally and then downward. Directly below each trolley is a horizontal ring 6 provided with a radial projection 7 supported by the lower end of the adjoining arm. The rings support molds 8, in or on which dinnerware is formed from ceramic material. For the purpose of illustration, cup molds are shown.

The conveyor drive B is supported beside the conveyor chain in any suitable manner. It is constructed and operates in the same general manner as the conveyor drive shown in Fig. 8 of Patent 2,555,227, and since it forms no particular part of this invention it will not be described here.

The conveyor, carrying empty molds, travels past the mold charger G where cylindrical slugs of clay are deposited in the molds. To feed the charger, clay is dumped into a hopper 11 shown in Fig. 1, from which augers feed it through horizontal tubes 12 to the lower end of a central vertical tube 13. The clay is forced in a column up through the vertical tube and out of a rectangular nozzle slot in the back side of its upper end. The clay is forced out of the slot in the form of a thick ribbon, which is supported by a conveyor, such as an endless horizontal conveyor belt 21, that travels faster than the ribbon. The ribbon is cut into square blanks 23 as it emerges from tube 13. The belt is driven enough faster than the ribbon to space the blanks the desired distance apart, which should be equal to the distance between the molds on the conveyor. As each blank approaches the opposite end of the belt, a circular charge or slug is cut out of it by a circular cutter 26 and is carried away. The rest of the blank, which now is scrap, falls off the front end of the belt onto another belt 24 running at right angles to it and is carried back to the hopper so that there is no loss of clay at this point. Each of the cutters 26 is mounted on the outer end of an arm 36, which is carried by endless chains driven from a sprocket 43 that in turn is driven by a chain 44 from a sprocket 45 turned by a shaft J that is rotated by the jigger. Thus, the movement of the cutters is synchronized with the operation of the jigger and the travel of the mold conveyor. The detailed construction and operation of the mold charging machine is set forth in my copending patent application, where it will be seen that each mold receives from a cutter 26 a charge of clay of a predetermined size and shape. Each cutter goes through the same cycle of first cutting out a slug of clay from a blank 23 at one side of the charger, picking it up and later depositing it in the center of a mold at the opposite side of the machine.

Figure 5:
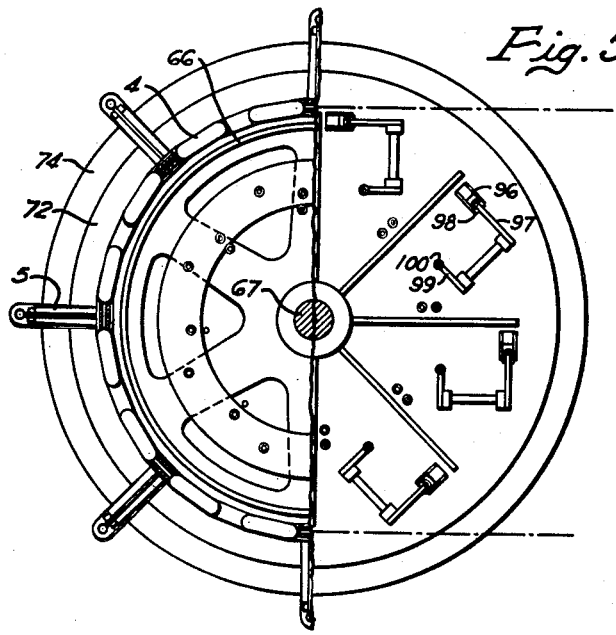
Figs. 5, 6 and 7 are horizontal sections through the jigger machine taken on the lines V—V, VI—VI and VII—VII, respectively, of Fig. 2.
Figure 6:
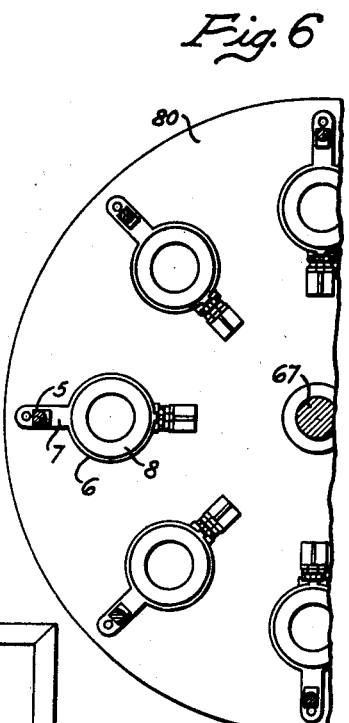

From the mold charger, the conveyor carries the mold to the automatic jigger C. Here the conveyor chain 4 passes around a large horizontal sprocket 66 and then on to the conveyor drive B. As shown in Fig. 2, the sprocket is rigidly mounted on the upper end portion of a large rotatable shaft 67, which is journaled at its upper end in the top of the jigger frame 68. The lower end of the shaft is journaled in the upper part of a stationary hollow cam drum 69 that is rigidly mounted on a central pedestal 70. Directly below the large sprocket, a circular plate 72 is rigidly mounted on the shaft. The bottom of this plate carries the jigger tools 73, of which there preferably are eight as indicated in Fig. 5. The plate is encircled by a depending skirt 74 that carries an outwardly projecting fork 75 beside each jigger tool for engaging a trolley arm 5 and holding it steady as the adjacent mold is carried around the shaft for a distance of 180°.

In order to raise the molds into operative relation with the jigger tools, there is a chuck 77 below each tool. These chucks are mounted on the upper ends of vertically movable posts 78 that extend down through bushings 79 in a table 80 rigidly mounted on the lower part of shaft 67 and rotatably supported by a circular track 81. Secured to each post below the top of the table are a pair of vertically spaced collars 82, between which there is a sleeve 83. The post is journaled in the sleeve. Projecting from the outer side of the sleeve is a laterally spaced pair of rollers 84 (Fig. 3) that can move only up and down astraddle of a vertical guide 86 secured to the bottom part of the table. This arrangement permits the post to move up and down and yet rotate. The inner side of the sleeve is provided with a roller 87 that travels in a cam track 88 in the side of the hollow drum. This track is shaped to raise and lower the sleeves as they are carried around the drum by the table, whereby the posts and chucks are raised and lowered.

Figure 7:
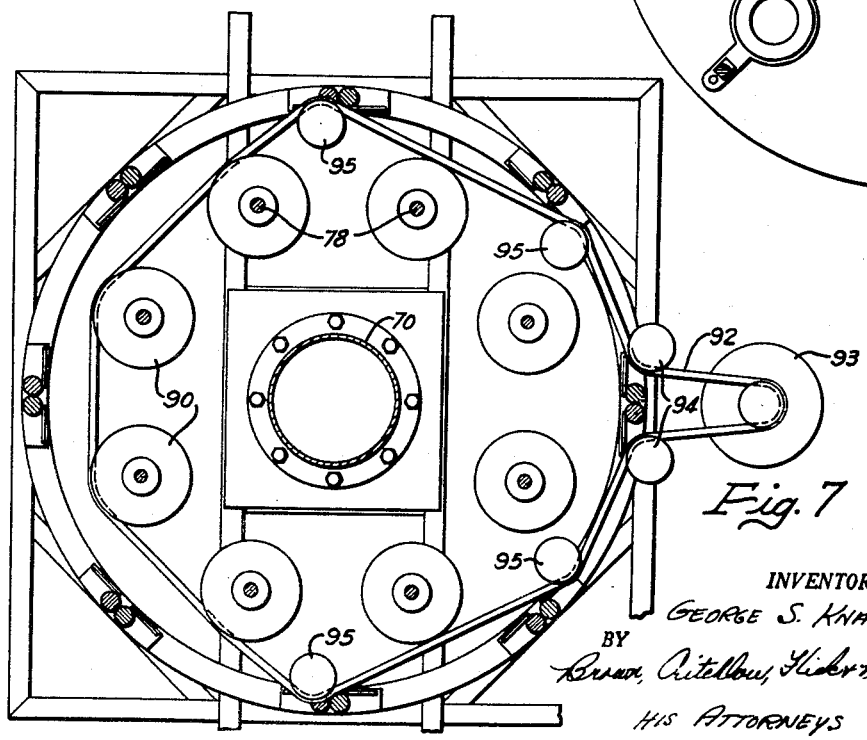

The lower part of each post 78 is splined in a pulley 90 that is rotatably supported by an arm 91 projecting downward from the bottom of the table. As the table is rotated by the central shaft 67, some of the pulleys are moved into and out of engagement with a continuously traveling endless belt 92 that is driven by a motor 93 at one side of the jigger machine, as shown in Fig. 7. The belt passes from the motor between a pair of sheaves 94 and then around other sheaves 95 which space the belt from half of the pulleys. As the table rotates and the chucks are moved up into engagement with the bottoms of the molds, the molds are lifted by them from the conveyor rings 6 and raised high enough for the jigger tools 73 to jigger the clay in the molds. At the same time, the raised chucks are rotated by the pulleys below them, which engage the belt 92. Then the molds are lowered into the rings and conveyed away from the jigger machine by the chain conveyor.

Each of the jigger tools 73 is rotatably supported by a bracket 96 fastened to the bottom of plate 72 and also extending up through an opening in it, as shown in Fig. 4. Rockably mounted on the plate is an arm 97 that engages the top of a brake rod 98 slidably mounted in the bracket above the jigger tool. When the arm is pressed down against the brake rod, the lower end of the rod presses against the top of the tool and stops it from rotating. The arm is rocked by a lever 99 that is pivotally connected to the lower end of a rod 100, slidably mounted in sprocket 66 and a bracket 101 mounted thereon. The upper end of the rod carries a roller that engages a cam 102 on the lower surface of the top of the jigger frame. The roller strikes this cam just as the chuck starts to lower the mold with a jiggered cup in it. Engagement of the roller with the cam applies the brake to the jigger tool.

While the cup is being jiggered, oil is sprayed into the mold from a tube 104 projecting from a normally closed valve 105 carried below plate 72. The valve is connected by a pipe 106 with a suitable oil supply. The valve is opened by a plunger rod 107 slidably mounted in the plate and the sprocket above it. The upper end of the rod carries a roller 108 that is moved downward when it engages a cam 109 on the stationary frame above it.

From the jigger machine, the molds with the newly jiggered cups therein are conveyed through the drier E to dry the cups in the usual manner. The conveyor then carries the cups past stripper F, where they are removed from the molds and deposited on an endless conveyor belt 110 that conveys them to a suitable location for further operations, such as handle attaching. The stripper is similar in construction and operation to the mold charger. That is, certain elements travel in an endless path along beside the conveyor and lift the cups out of the molds and then, on the opposite side of the machine, deposit the cups on conveyor 110. The stripper machine is driven through sprocket 114 and chain 121 from a sprocket 122 turned by a shaft H that is rotated by the jigger shaft 67. Sprocket 114 operates mechanism for carrying a plurality of arms 129 around the machine. Supported by the outer end of each arm is a horizontal diaphragm 131 that moves down and up at certain points. When it moves down into a mold on the chain conveyor, it is pressed down against the bottom of a cup 138 therein. As this occurs, the air pressure between the diaphragm and the cup is reduced by a vacuum pump so that the cup can be lifted out of the mold by the diaphragm and carried around to the opposite side of the stripper where it will deposit the cup on conveyor belt 110. In this way, each mold is relieved of its cup, which then is deposited on belt 110 for transportation to another location.

From the stripper, the conveyor A returns empty molds to the mold charger G to repeat the cup forming cycle that has just been described.

The modified jigger machine shown in Fig. 8 is essentially the same as the one previously described, except that the mold chucks are not rotated but the jigger tools are. Also, jiggering of plates is illustrated, although the same idea is likewise applicable to cups.

The center shaft 141 is rotated continuously by the conveyor chain (not shown) passing around a sprocket on the upper end of the shaft. Rigidly mounted on the shaft is a circular plate 142 that carries disc-like jigger tools 143. Each tool is inclined to the horizontal and is mounted on the lower end of an inclined shaft 144 journaled in a bearing 146 supported by the lower end of a vertical spindle 147. This spindle is journaled in a bearing 148 mounted on the plate, and is coaxial with the underlying chuck 149. Rigidly mounted on each vertical spindle is a horizontal pulley 150, while an endless belt 151 extends around all of these pulleys and also around a pulley 152 driven by an electric motor 153 supported by a bracket 154 on the table 155 that rotates with shaft 141. The jigger tools therefore are rotated continuously by the motor.

Each chuck 149 is mounted on the upper end of a vertically movable post 156 that extends down through the table and is supported by a roller 157 that rides on a stationary cam drum 158 to raise and lower the chuck. When a chuck is raised, it lifts a mold 159 from a conveyor ring 160 and raises it high enough for a rotating jigger tool to jigger the clay on the mold. Then the mold is lowered into the ring and carried away from the jigger machine by the chain conveyor to a drier.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with an endless conveyor chain provided with dinnerware mold carriers, of a jigger machine comprising a table, means operatively connecting the chain with the table for rotating it continuously, vertically movable chucks carried by the table in circumferentially spaced relation below said carriers, means for raising the chucks periodically and in succession from the rotating table to lift molds from the carriers, means for rotating the raised chucks, a rotary jigger tool above each chuck, means supporting the tools and rotatable in unison with said table, a brake adjacent each tool, brake-actuating means carried by said tool-supporting means, and stationary cam means adapted to be engaged by said actuating means for pressing said brakes against each successive tool at the completion of its jiggering operation.

2. The combination with an endless conveyor chain provided with dinnerware mold carriers, of a jigger machine comprising a table, means operatively connecting the chain with the table for rotating it continuously, vertically movable chucks carried by the table in circumferentially spaced relation below said carriers, means for raising the chucks periodically and in succession from the rotating table to lift molds from the carriers, means for rotating the raised chucks, a rotary jigger tool above each chuck, means supporting the tools and rotatable in unison with said table, an axially movable brake rod having one end substantially engaging each tool, means carried by said tool-supporting means for pressing against the opposite end of each brake rod, and stationary cam means adapted to be engaged by said rod-pressing means to push the rods against each successive tool at the completion of its jiggering operation, whereby to stop rotation of the tool.

References Cited in the file of this patent

UNITED STATES PATENTS

| | | |
|---|---|---|
| 2,132,788 | Hunt | Oct. 11, 1938 |
| 2,359,433 | McNamara | Oct. 3, 1944 |
| 2,409,172 | Miller | Oct. 8, 1946 |
| 2,712,679 | Everhart et al. | July 12, 1955 |
| 2,729,870 | Guthrie | Jan. 10, 1956 |
| 2,748,424 | Fay | June 5, 1956 |

UNITED STATES PATENT OFFICE
CERTIFICATE OF CORRECTION

Patent No. 2,930,095            March 29, 1960

George S. Knapp

It is hereby certified that error appears in the above numbered patent requiring correction and that the said Letters Patent should read as corrected below.

In the grant, lines 1, 2, and 3, for "George S. Knapp, of Newell, West Virginia," read -- George S. Knapp, of Newell, West Virginia, assignor to The Homer Laughlin China Company, of Newell, West Virginia, a corporation of Delaware, --; line 12, for "George S. Knapp, his heirs" read -- The Homer Laughlin China Company, its successors --; in the heading to the printed specification, line 3, for "George S. Knapp, Newell, W. Va." read -- George S. Knapp, Newell, W. Va., assignor to The Homer Laughlin China Company, Newell, W. Va., a corporation of Delaware --.

Signed and sealed this 25th day of October 1960.

(SEAL)
Attest:

KARL H. AXLINE            ROBERT C. WATSON
Attesting Officer         Commissioner of Patents